Figure 1:
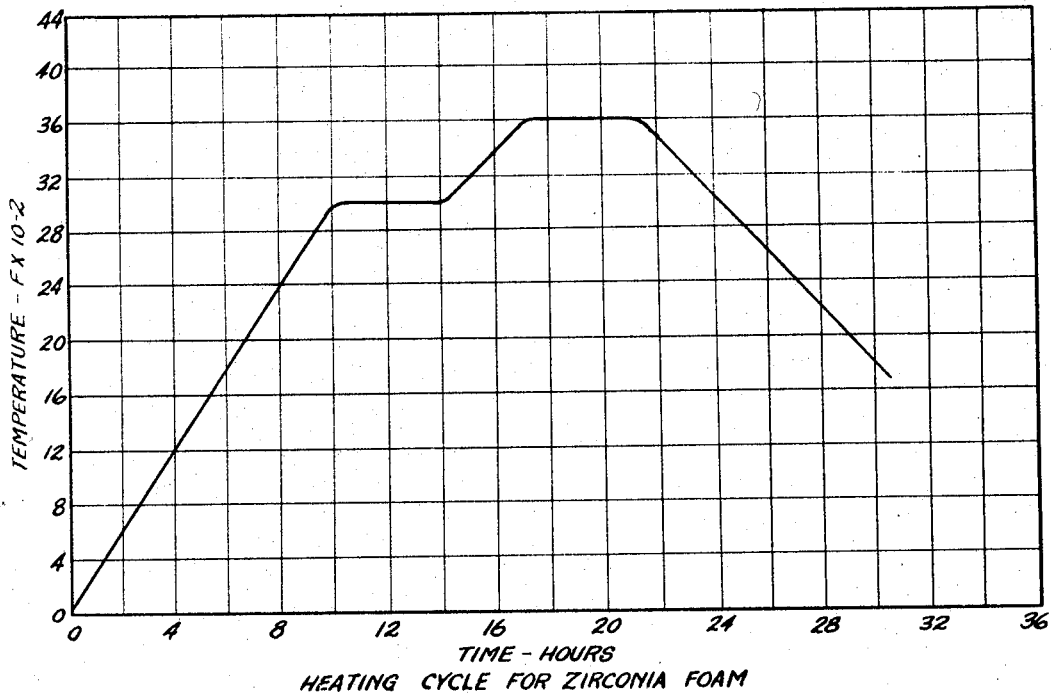

HEATING CYCLE FOR ZIRCONIA FOAM

STEADY-STATE THERMAL DROP ACROSS ZIRCONIA FOAM

INVENTOR.
ARTHUR R. MASOERO

BY

ATTORNEY 3,393,079
POROUS CERAMIC OXIDES AND METHOD
Arthur R. Masoero, Seattle, Wash., assignor to The Boeing Company, Seattle, Wash., a corporation of Delaware
Filed May 29, 1963, Ser. No. 284,221
15 Claims. (Cl. 106—40)

This invention relates to an improvement in porous refractory ceramic materials and more particularly to permeable refractory oxide compositions having improved thermal and mechanical shock resistance, bond strength and structural stability.

Permeable refractory oxide materials have been the subject of considerable experimental and developmental work because of their favorable low densities and high insulation properties. The prior art to this invention has produced permeable ceramic-base structures by foaming through mechanical and chemical means a slurry containing the oxide (ceramic oxide powder), phosphoric acid ($H_3PO_4$), a blowing agent (usually dolomite, $$CaCO_3 \cdot MgCO_3)$$

a foam stabilizer (often $CaSiO_3$) and sufficient water to make a workable mixture. At first most of the foams produced needed at least two days of air drying in order to be safely handled without slumping, then followed by approximately 24 hours drying to eliminate excess moisture. Subsequent developments have attained permeable ceramic foams with setting times of approximately two hours or less. These foams attain a rigidity which permits them to be shaped or formed as desired without danger of slumping. These foams also have reduced drying times.

The oxide-base material used in most foams is zirconia or aluminum oxide and these materials can be successfully employed in the present invention. Previously the stabilizing agents in most low density refractory oxides have been plaster of Paris, calcium silicate, or related silicates. In the present invention plaster of Paris, $CaSO_4 \cdot \frac{1}{2}H_2O$, is preferred. Phosphoric acid has been known previously as an adequate foaming agent and can be very successfully employed in the present invention. Water is also common to this invention and the prior art, but this invention does not use an alkali metal silicate or a silica sol as constituents. The sole importance of the phosphoric acid is to produce a foaming action by hydrogen evolution instead of producing a phosphate bond for the foam product, as was previously done. Instead, the same metal used for the oxide compound is carefully mixed in a predetermined proportion to give a controlled porosity to the final refractory oxide by its reaction with the phosphoric acid. In this sense a fine metal powder replaces a metallic compound thus reducing contamination of the resulting foam product. The current invention differs from the prior art for permeable ceramic bodies in that instead of having a bonding agent of different identity than the ceramic refractory oxide itself, as was done previously, the current invention has a sintered bond of the same composition as the ceramic refractory oxide serving as the base of the material. Therefore the instant foamed ceramic refractory oxide has no weakness due to its bond not holding the refractory oxide particles together.

From this discussion it appears that the instant invention differs from the prior art in its bond, its method of producing porosity, its method of controlling porosity and its strength properties. A shock resistant material of high bond strength and resulting structural and surface stability and integrity is thereby produced.

A related object of this invention is to achieve a controlled porosity by reacting a predetermined ratio of acid with a metal comprising the metallic element of the final refractory ceramic oxide. These variable ratios of metal to acid have the effect of controlling the porosity of the refractory oxide structure. The amount of effervescence desired is controlled by varying the surface area of the metal available to react with the volume of acid.

Further objects and applications of this invention will become apparent from the following description and claims and attached drawings wherein:

FIG. 1 is a graph having temperature in Fahrenheit as the vertical ordinate and the time in hours as the horizontal ordinate. The variation in temperature for a certain unit of time during the final heat treatment of the zirconia foam is graphically portrayed in this figure.

Figure 2:
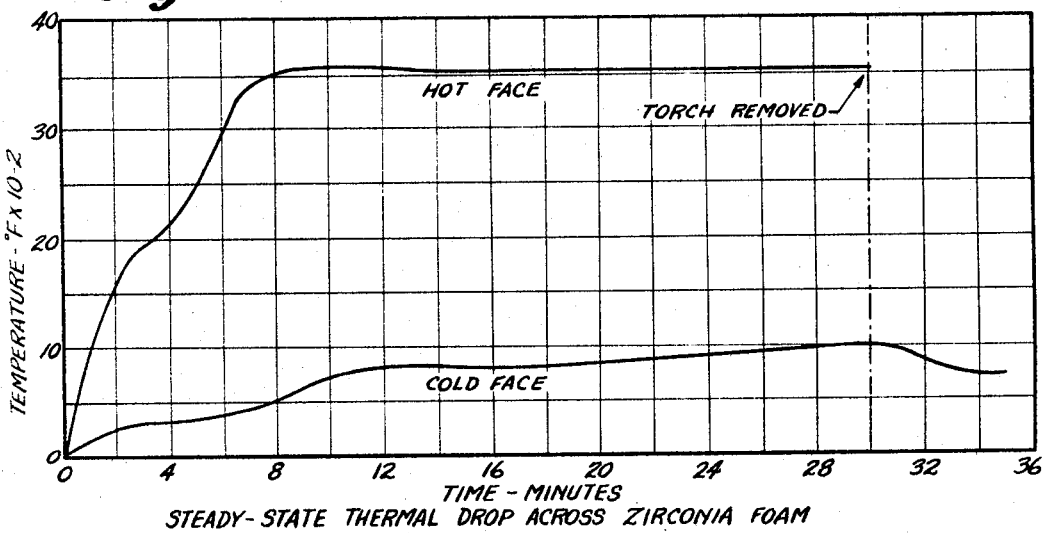

FIG. 2 is a graph showing the greatly improved insulation properties in respect to temperature of the instant zirconia foam product. The vertical ordinate is temperature in Fahrenheit and the horizontal ordinate is time in minutes. This picture portrays the rise in temperature of a zirconia foam interface when the opposite interface is subjected to a high temperature heat source.

This invention basically achieves a homogeneous, permeable sintered refractory oxide body which has a high bond strength with surface and structural integrity. This structure has these properties primarily because its sintered bond is the same basic refractory oxide as the matrix. It therefore has no weak bond links. Previous permeable refractory oxide materials have used bonding material of lower temperature tolerances than the base refractory oxide material, so that the bonding material is the weakest part of the structure. The present invention effectively discards this weakness.

This invention also a achieves a different foaming reaction. A ratio of ingredients for controlling this reaction is based on the surface area available for reaction and the effective elimination of the reaction products by heating so that the final product, except for minute impurities, will have a refractory oxide base structure. The ratio of the volume of acid to the surface area of the metal powder reacting with the acid is the key here for controlling porosity. In addition to varying the surface area of the metal powder for the volume of the acid, we can introduce external pressure to slow the reaction thus forming smaller gas spheres. Heat has been employed to nucleate the reaction between several of the metal powders and the acid, since phosphoric acid is often unreactive with some metal powders at room temperature. Naturally, the higher the temperature to which the mixture is heated, the greater the speed of reaction and the greater the volume of porosity.

The ceramic oxide in my formulation is the basic ingredient forming the final foamed structure. The plaster of Paris or related substance serves as the stabilizing agent during the setting, forming, and firing steps. This ingredient is then sublimed during the final high temperature firing operation. By that time the sintered permeable refractory oxide has sufficient structural strength so as not to need a stabilizing agent. The water is added merely to serve as a medium promoting the chemical reaction between the acid and the metal powder. The water later evaporates when heated. The acid serves as a source of hydrogen for the foaming step in the following process, and the acid reacts solely with the added metal powder. A ratio of metal powder to acid volume is practiced with the surface area of the metal powder being the controlling consideration in the ratio calculations. As a result of aggregating the components, the mixture has a temperature of 110° F. to 140° F. at atmospheric pressure. The metal reacts with the acid to form a metallic compound which, on the final heating to high temperature, decomposes to form a metallic oxide of the same composition as the basic foamed ceramic oxide. Other extraneous matter sublimes during the heat treatment.

The production of effervescence in the instant disclosure is controlled by the metal surface area to phosphoric acid ratio which in turn influences the porosity of the resulting structure and the weight of the resulting structure. The ratio of metal to phosphoric acid of 1 part metal of −325 mesh particle size to 3.33 parts of phosphoric acid is satisfactory for a minimum of effervescence and a maximum of weight for the structure. The ratio of metal to phosphoric acid of 1 part metal of −325 mesh particles size to 4 parts of phosphoric acid is satisfactory for a maximum of effervescence and a minimum of weight for the structure. These ratios do not serve as functional limits but merely as practical limits for current requirements of foams. Practical foaming operations could be conducted with a minimum ratio of 1 part of metal for every 2.5 parts of phosphoric acid and a maximum ratio of 1 part of metal for every 7 parts of phosphoric acid. If greater product ranges are required then the above range could be broadened.

This formulation is based on having certain surface areas available for each acid volume. Our experience has shown us that for a −325 mesh zirconium metal powder it is desirable to vary the acid to metal powder from 1 cubic centimeter of acid for each 1.60 square feet of metal powder surface area to 1 cubic centimeter of acid for each .50 square feet of metal powder surface area. For a −200 mesh zirconia metal powder, it is desirable to vary the acid to metal powder from 1 cubic centimeter of acid for each .95 square feet of metal powder surface area to 1 cubic centimeter of acid for each .30 square feet of metal powder surface area.

The achievement of a complete refractory oxide structure including the sintered refractory oxide bond can best be fully presented with the discussion of fabrication and synthesis of the permeable metal oxide structure. The metal oxide serving as the structural base is obtained in micro-particle size (−200 mesh to −325 mesh is satisfactory). To this are added in order, a highly purity bonding agent, distilled water, an acid and powdered metal in the following proportion:

Metallic oxide [1] 1450 parts, bonding agent 15 parts, water 32 parts, acid 52 parts, metal powder [2] (same metal as in above oxide) 6 parts It must be recognized that this ratio will vary for the metal and phosphoric acid constituents in accordance with the ratio of the metal to the phosphoric acid. Also the above formulation can be varied by at least ±50% of the value for each listed constituent.

The procedure of synthesizing the permeable refractory oxide material begins by mixing the above stated constituents in the order listed. Blending of the powders to ensure uniformity was accomplished by placing the two dry ingredients (metal oxide and bonding agent) along with a zirconia grinding media in a rubber or polyethylene lined container and rotating on a jar mill for 16 hours. The contents were next placed in a mixing bowl with additions of the cold tap water and the reacting acid. This was mixed to the point of forming a mixture of thick creamy consistency. To this aggregate, the metal powder was mixed after which the mixture was poured into molds for blowing and curing.

A collapsible aluminum mold, covered with a Mylar® film and placed upon a transite plate, produced the best results for holding the foamed material. A metal plate beneath the mold removed a large amount of the exothermic heat necessary to sustain the reaction. While the outer area of foam mass is setting, the center of the foam mass is still reacting. The foam product exhibits a large delamination around the periphery as a result.

The foaming reaction normally lasts for 10 to 15 minutes after which the foam mass is allowed to cool to room temperature at which time the mold is removed. The

[1] −325 mesh particle size.
[2] −200 to −325 mesh particle size.

large mass of the foam product and the inherent insulative qualities of the foam require adequate circulation of air to the total surface area of the foam product during curing.

After completing the above steps, the foam product is ready for curing. The two-stage heating cycle was necessary to prevent cracking. The first stage starts with the foam product being placed in an oven which has suitable receptacles filled with water to insure a high humidity environment for 20 hours. The temperature is increased during this stage from room temperature to 200° F. in 20 hours at an even rate. The second stage entails removal of the remaining water and increasing the temperature from 200° F. to 800° F. in 8 hours. The foam product is exposed to this 800° F. for an additional 8 hours, after which the foam product exhibits excellent handleability.

The heating cycle is a characteristic of the particular metallic oxide system being employed and is discussed for each following example. For each material there is a final firing to maximum temperature. Before final firing to maximum temperature my experience with foam products has taught me to cut the foam to the desired shape and size of the finished product with 15% excess allowed on all dimensions for shrinkage. The cutting is done with a band saw using a horizontal electric sander for touching up. Care is taken to remove all loose dust particles from the pores by air blasting.

As mentioned previously, the final firing operation is a characteristic operation for each material system being employed and is discussed with each example. This final firing results in a foam which is extremely hard and possessed high strength in comparison to its light density.

Example 1

A typical formulation for a zirconia foam product is as follows:

| | Parts |
|---|---|
| Zirconium dioxide [1] | 450 |
| Plaster of Paris | 15 |
| Water | 32 |
| Phosphoric acid | 52 |
| Zirconium metal powder [2] | 6 |

[1] −325 mesh particle size.
[2] −200 to −325 mesh particle size.

This formulation is typical for this system and not limiting as any ingredient can be varied by ±50 percent. In practice the zirconium oxide has been split so that half of the total is monoclinic zirconium dioxide and the other half is cubic zirconium dioxide. Since zirconia has a transition from monoclinic to tetragonal crystallographic structure at 1800° F. to 2000° F., the above proportion of crystallographic forms is used to stabilize the structure during the final firing. The mixing procedure, the order of the addition of the ingredient, the acid-zirconium metal reaction, the curing of the foam product and the cutting to final dimensions are as described previously.

The final firing is done in an electrical resistance furnace with a typical firing cycle being FIGURE 1. The material is heated from room temperature to 3000° F. in 10 hours with special precaution taken through the temperature range of 1800° F. to 2000° F. where the zirconia changes from monoclinic to the tetragonal crystallographic form. After holding the temperature at 3000° F. for four hours, the temperature is next raised to 3600° F. at which it is held for four hours. Next the material is furnace cooled to room temperature according to FIGURE 1.

The composition of the resulting zirconia ceramic is as follows:

| Sample | Constituent | Weight percent |
|---|---|---|
| Fired to 3,600° F. and held at 3,600° F. for 2 hours. | $ZrO_2$ | 95.708±2 |
| | CaO | 2.198±2 |
| | $P_2O_5$ | .650±.5 |
| | $Zr(SO_4)_2$ | .088±.05 |

Trace impurities and water explain why this analysis does not total 100%. The refractory oxide is expected to account for 96% to 98% of the total matrix in all foam products.

At this point emphasis can only properly be directed to the superior properties achieved in my permeable refractory oxide product. Most of the explanation resides in the improved refractory oxide bond, the bond being of the same composition as the refractory oxide matrix. However my firing technique which achieves a minimal impurity level is another improvement. Impurities originate in the foam product from the additives and reaction products and are effectively sublimed through the high heating temperature which also forms our improved bond strength. The following table for the same material composition given above but with a 200° F. difference in the maximum firing temperature gives significantly different properties:

|  | Max. Firing Temp., °F. | Compression force needed for failure, p.s.i. |
| --- | --- | --- |
| Same composition of refractory oxide | 3,400 | 1,000 |
|  | 3,600 | 1,400 |

NOTE.—These are average values of 5 tests.

The effective impurity level was decreased by 1% by the higher firing temperature with a 300 p.s.i. increase in compressive strength.

The permeable refractory oxide structure achieved in my invention has an average ratio of open to closed pores of 1 to 12 excluding microporosity. A calculated apparent density of a representative sample was 4.56 gm./cm.$^3$. The difference between the calculated apparent density and the theoretical density of zirconia (5.75 gm./cm.$^3$) is accounted for by the microporosity in the cell walls which could not be measured. This foam has a density of 80 lb./ft.$^3$ with the "dead air" spaces constituting a significant factor in the low thermal conductivity.

The outstanding physical properties of this material distinguishing it from prior permeable refractory oxides are its high degree of cubic stabilization, thermal shock resistance and improved compressive strength. Thermal shock tests substantiating this claim were of two types: (a) heating the material to 2500° F. for 5 minutes and then quenching the material in water, and (b) heating the material to 3500° F. for 20 minutes with a subsequent rapid air quench to room temperature. The foam product exhibited no apparent defects or failures from these tests, and the foam showed very desirable qualities as far as being capable of withstanding severe temperature changes. The compressive strength of this product is much greater than previous permeable refractory oxides because of the material's uniform composition and refractory oxide bond.

FIGURE 2 shows the insulative properties of the zirconia foam when a high temperature heat source is applied to one face (the hot face) of the zirconia foam. The measurement of the temperature of the opposite face (the cold face) reflects the insulative properties of the zirconia foam. The vertical line at the right of FIGURE 2 (at 30 minutes) represents when the heat source is removed from the hot face. This test represents the excellent insulative properties of this zirconia foam structure.

Example 2

A typical formulation for an alumina foam product is as follows:

|  | Parts |
| --- | --- |
| Aluminum oxide [1] | 450 |
| Plaster of Paris | 15 |
| Water | 32 |
| Phosphoric acid | 52 |
| Aluminum metal powder [2] | 6 |

[1] —325 mesh particle size.
[2] —200 to —325 mesh particle size.

This formulation is typical for this system and not limiting as any ingredient can be varied by ±50 percent. The mixing procedure, the order of the addition of the ingredients, the acid-aluminum metal reaction, the curing of the foam product and the cutting to final dimensions is as described previously.

The final firing is done in an electrical resistance furnace with the maximum temperature for the cycle being 2850° F. This temperature is held for four hours before furnace cooling to room temperature. The end product exhibits all of the desirable properties described above for zirconia foam except as controlled and modified by the alumina foam structure.

Example 3

A typical formulation for a hafnia foam product is as follows:

|  | Parts |
| --- | --- |
| Hafnium oxide [1] | 450 |
| Plaster of Paris | 15 |
| Water | 30 to 40 |
| Phosphoric acid | 52 |
| Hafnium metal powder [2] | 6 |

[1] —325 mesh particle size.
[2] —200 to —325 mesh particle size.

This formulation is typical for this system and not limiting as any ingredient can be varied by ±50 percent. The mixing procedure, the order of the addition of the ingredients, the acid hafnium metal reaction, the curing of the foam product and the cutting to final dimensions is as described previously.

The final firing is done in an electrical resistance furnace with the maximum temperature for the cycle being 3200° F. This temperature is held for four hours before furnace cooling to room temperature. The end product exhibits all of the desirable properties described above for the zirconia foam except as controlled and modified by the hafnia foam structure.

Example 4

A typical formulation for a beryllia foam product is as follows:

|  | Parts |
| --- | --- |
| Beryllium oxide [1] | 450 |
| Plaster of Paris | 15 |
| Water | 30 to 40 |
| Phosphoric acid | 52 |
| Beryllium metal powder [2] | 6 |

[1] —325 mesh particle size.
[2] —200 to —325 mesh particle size.

This formulation is typical for this system and not limiting as any ingredient can be varied by ±50 percent. The mixing procedure, the order of the addition of the ingredients, the acid-beryllium metal reaction, the curing of the foam product and the cutting to final dimensions is as described previously.

The final firing is done in an electrical resistance furnace with the maximum temperature for the cycle being 3200° F. This temperature is held for four hours before furnace cooling to room temperature. The end product exhibits all of the desirable properties described above for the zirconia foam except as controlled and modified by the beryllia foam structure.

I claim:
1. A process for making porous zirconium oxide structures comprising:
   (a) uniformly mixing different crystallographic forms of zirconium dioxide particles with particles of plaster of Paris until a homogeneous powder is obtained,
   (b) adding water to this homogeneous powder to serve as a fluid medium,
   (c) adding phosphoric acid with a predetermined amount of zirconium powder, so that gas evolution results from the reaction of the zirconium and the acid as aided by agitation assuring uniform reactivity,
   (d) eliminating moisture by heating,
   (e) shaping the pliable porous medium to the desired shape and dimensions with an allowance for shrinkage, and (f) firing the product at elevated temperatures.

2. A process for making porous zirconium oxide structures comprising:
(a) uniformly mixing zirconium dioxide particles with plaster of Paris particles until a homogeneous powder is obtained,
(b) adding water to this homogeneous powder to serve as a fluid medium,
(c) adding phosphoric acid with a predetermined amount of zirconium powder, so that gas evolution results from reaction of the zirconium and the acid as aided by agitation assuring uniform reactivity,
(d) eliminating moisture by heating to a temperature sufficient to evaporate said moisture,
(e) shaping the pliable porous medium to the desired shape and desired dimensions with an allowance for shrinkage, and
(f) firing the product at elevated temperatures.

3. A process for synthesizing a permeable zirconium dioxide material having microporosity and macroporosity comprising:
(a) mixing zirconium dioxide powder and plaster of Paris powder into a homogeneous powder,
(b) mixing water into the homogeneous powder,
(c) incorporating a calculated ratio of acid and zirconium metal powder into the mixture of step (b) thus producing effervescence by the reaction of the acid and the zirconium metal powder which gives a porous body of material,
(d) preliminarily heating the porous body of step (c) to a temperature sufficient to eliminate moisture, and
(e) firing the porous body of step (c) at elevated temperature.

4. The process for synthesizing a permeable zirconium dioxide material as set forth in claim 3, to which is added the step of shaping the porous body of material of step (c) after the heating of step (d).

5. A process for synthesizing a permeable hafnium oxide material having macroporosity and microporosity comprising:
(a) mixing hafnium oxide powder and plaster of Paris powder into a homogeneous powder,
(b) mixing water into the homogeneous powder,
(c) incorporating a calculated ratio of acid and hafnium metal powder into the mixture of step (b) thus producing effervescence by the reaction of the acid and the hafnium metal powder which gives a porous body of material,
(d) preliminarily heating the porous body of step (c) to a temperature sufficient to eliminate moisture, and
(e) firing the porous body of step (c) at elevated temperature.

6. The process for synthesizing a permeable hafnium oxide material as set forth in claim 5, to which is added the step of shaping the porous body of material of step (c) after the heating of step (d).

7. A process for synthesizing a permeable beryllium oxide material having macroporosity and microporosity comprising:
(a) mixing beryllium oxide powders and plaster of Paris powder into a homogeneous powder,
(b) mixing water into the homogeneous powder,
(c) incorporating a calculated ratio of acid and beryllium metal powder into the mixture of step (b), thus producing effervescence by the reaction of the acid and the beryllium metal powder which gives a porous body of material,
(d) preliminarily heating the porous body of step (c) to a temperature sufficient to eliminate moisture, and
(e) firing the porous body of step (c) at elevated temperature.

8. The process for synthesizing a permeable beryllium oxide material as set forth in claim 7, to which is added the step of shaping the porous body of material of step (c) after the heating of step (d).

9. A means for achieving porosity for a final fired zirconium dioxide structure comprising mixing a ratio of acid and zirconium powder into a water slurry of zirconium dioxide powder and plaster of Paris, said ratio of acid and zirconium powder being based on the surface areas of zirconium powder available to react with each unit of acid and said ratio of acid to zirconium powder producing hydrogen gas which promotes the porosity in the final fired structure.

10. A means for achieving porosity for a final fired hafnium oxide structure comprising mixing a ratio of acid and hafnium powder into a water slurry of hafnium oxide powder and plaster of Paris, said ratio of acid and hafnium powder being based on the surface area of hafnium powder available to react with each unit of acid and said ratio of acid to hafnium powder producing hydrogen gas which promotes the porosity in the final fired structure.

11. A means for achieving porosity for a final fired beryllium oxide structure comprising mixing a ratio of acid and beryllium powder into a water slurry of beryllium oxide powder and plaster of Paris, said ratio of acid and beryllium powder being based on the surface area of beryllium powder available to react with each unit of acid and said ratio of acid to beryllium powder producing hydrogen gas which promotes the porosity in the final fired structure.

12. A permeable refractory oxide matrix comprising:

| Constituent: | Percentage by weight |
|---|---|
| $ZrO_2$ | 95.7±2 |
| CaO | 2.2±2 |
| $P_2O_5$ | .65±.5 |
| $Zr(SO_4)_2$ | 0.88±.05 |

13. A cellular material cured at the temperature in excess of 3000° F. comprising zirconium dioxide joined together so as to have microporosity and macroporosity and having the additional constitutents of calcium oxide, phosphoric oxide and zirconium sulphate comprising 4.3±2% by weight of the total matrix.

14. A cellular material as set forth in claim 13 wherein the zirconium and zirconium dioxide constituents are replaced with hafnium and hafnium oxide constituents.

15. A cellular material as set forth in claim 13 wherein the zirconium and zirconium dioxide constituents are replaced with beryllium and beryllium oxide constituents.

References Cited

UNITED STATES PATENTS

| | | | |
|---|---|---|---|
| 2,741,822 | 4/1956 | Udy | 264—60 |
| 1,897,667 | 2/1933 | Husain et al. | 106—40 |
| 2,278,486 | 4/1942 | Quigley et al. | 106—40 |
| 2,624,097 | 1/1953 | Kistler | 106—41 |
| 2,966,421 | 12/1960 | Zimmerman et al. | 106—40 |
| 2,984,576 | 5/1961 | Alexander et al. | 106—57 |
| 3,097,930 | 7/1963 | Holland | 106—41 |
| 3,223,537 | 12/1965 | Wiegert | 106—65 |
| 3,223,538 | 12/1965 | Wiegert | 106—57 |

HELEN M. McCARTHY, *Primary Examiner.*